B. G. LAMME.
DYNAMO ELECTRIC MACHINE.
APPLICATION FILED FEB. 21, 1911.

1,082,532.

Patented Dec. 30, 1913.

WITNESSES:
Fred H. Miller

INVENTOR
Benjamin G. Lamme
BY
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,082,532.  Specification of Letters Patent.  Patented Dec. 30, 1913.

Application filed February 21, 1911. Serial No. 609,948.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Dynamo-Electric Machines, of which the following is a specification.

My invention relates to dynamo-electric machines and it has special reference to dampers for the field members of rotary converters and other synchronous machines.

The object of my invention is to provide a damper or auxiliary winding for electric machines of the class above indicated that shall be very effective in opposing and minimizing wasteful magnetic fluxes and that shall have no damping effect on changes in the useful flux of the machine.

As usually constructed, a damper for synchronous machines consists of a number of conductors located in slots in the pole faces and end members connected thereto to form a cage or grid in the pole face. All the conductors on a single polar projection are usually connected together at both ends and, in some cases, all of the conductors of the machine are connected by end rings to form a complete cage winding. A damper of this character is very effective for performing its proper function of damping out cross fluxes and preventing hunting, but it is also linked by the main or useful flux and tends to prevent changes therein. Consequently, such a damper is especially undesirable where rapid changes in the field flux of the machine are necessary.

According to my present invention, I provide a damper which consists of a number of independent groups of coils, each coil being closed on itself and the arrangement being such that the damper has no influence on the main or useful flux, but nevertheless, is effective in opposing changes in the cross flux.

Figure 1:
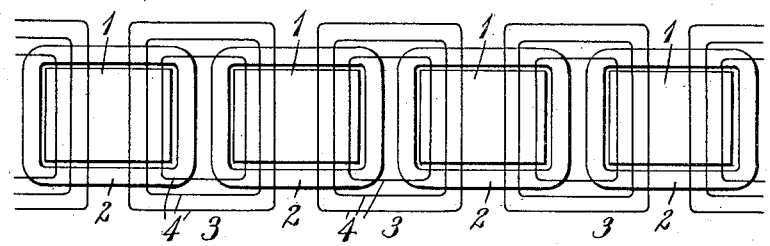
Figure 2:
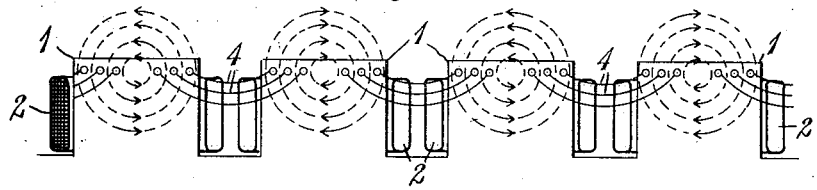
Figure 4:
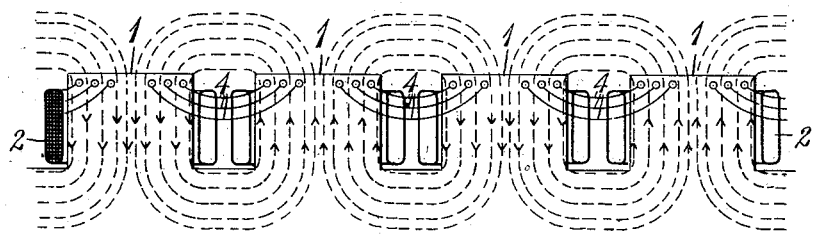
Figure 3:
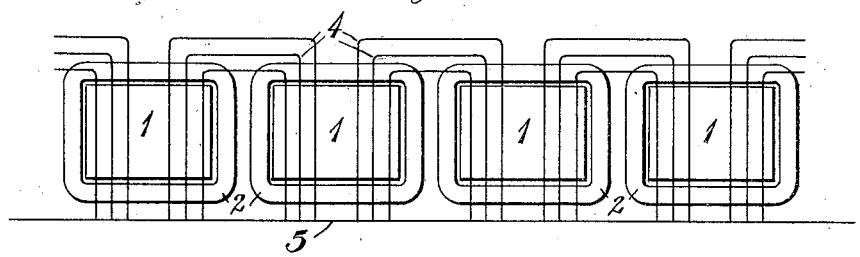

Figure 1 of the accompanying drawings is a diagrammatic view of the field member of a dynamo-electric machine provided with the damper of my invention; Fig. 2 is a view at right angles to Fig. 1 with the wasteful cross fluxes indicated by broken lines; Fig. 3 is a view similar to Fig. 2, with the main or useful flux indicated by broken lines, and Fig. 4 is a view corresponding to Fig. 1 of a modified damper embodying my invention.

Referring to Figs. 1, 2 and 3, the polar projections 1 of the field member of a dynamo-electric machine are provided with magnetizing coils 2 and with a damper winding which consists of groups 3 of concentric short circuited interpolar coils 4. The cross flux indicated by broken lines in Fig. 2 of the drawings, is, of course, actually superposed on the main field flux indicated by broken lines in Fig. 3 or is combined therewith, but they have been separated for convenience in illustration and will first be considered independently and then as combined in a dynamo-electric machine.

Considering the middle group 3 of concentric short-circuited coils shown in Fig. 2 and the cross fluxes in the adjacent polar projections, which are of opposite polarity, it is evident that the two cross fluxes act in the same direction and, consequently, instead of neutralizing or partially neutralizing each other, they act together in tending to produce electric current in the short circuited coils. Consequently, these coils have a strong tendency to damp out the cross fluxes.

As shown in Fig. 3, the main field flux produced by the field coils 2 acts oppositely in adjacent north and south poles and, consequently, if any one of the short circuited coils 4 interlinks an equal number of lines in each of the two adjacent poles, the effect on the main flux in producing currents in the short circuited coils will be *nil* and, conversely, the short circuiting coils will have no damping effect on the main field flux.

If the main and cross fluxes are combined, there will be an increased number of flux lines in the left-hand half of each polar projection and a corresponding decrease in the number of flux lines in the right-hand half of each polar projection. The flux lines in the left-hand half tend to produce a definite current in the short circuited coils interlinked and the flux lines in the right-hand half of the adjacent polar projection tend to produce a smaller current in the same coils in the opposite direction. It is evident, however, that it is only the difference between the flux in the left-hand side of one pole and the flux in the right-hand side of the adjacent pole, or, in other words, the cross flux which tends to produce any current in the short circuited coils and therefore upon which any damping action is exerted by the short-circuited coils.

I have used the term "interpolar" as applied to the short circuited coils to indicate that they include a part of each of two adjacent poles as opposed to the main field coils which include and produce the magnetic poles of the machine.

Referring to Fig. 4 of the drawings, the damper winding here shown is similar to that of Fig. 1, except that all of the coils 4 are joined at one end by a conductor 5 instead of being entirely independent of each other. The action of the damper winding is the same in both cases.

I desire that the scope of my invention be limited only by the appended claims.

I claim as my invention:

1. A damper for a synchronous dynamo-electric machine core member having polar projections that comprises groups of independent closed circuit interpolar coils.

2. A damper for a synchronous dynamo-electric machine core member having polar projections that comprises a plurality of coil groups severally consisting of independent closed-circuit concentric interpolar coils.

3. A synchronous dynamo-electric machine field member comprising polar projections, magnetizing means therefor and a plurality of independent closed-circuit damping coils that individually influence equal portions of two adjacent polar projections.

4. A synchronous dynamo-electric machine field member comprising polar projections, magnetizing coils therefor and groups of independent closed-circuit concentric damping coils that individually include equal portions of adjacent polar projections.

5. A synchronous dynamo-electric machine field member comprising polar projections, magnetizing coils therefor and groups of independent closed-circuit interpolar coils for damping out cross fluxes.

In testimony whereof, I have hereunto subscribed my name this 17th day of Feb., 1911.

BENJ. G. LAMME.

Witnesses:
E. LIVINGSTONE,
B. B. HINES.

Copies of this patent may be obtained for five cents each, by addressing the "Commissioner of Patents, Washington, D. C."